United States Patent
Haraguchi

(10) Patent No.: US 10,694,727 B2
(45) Date of Patent: Jun. 30, 2020

(54) CLUTCH OPERATION UNIT AND DUAL-BEARING REEL

(71) Applicant: Shimano Inc., Sakai, Osaka (JP)

(72) Inventor: Hitoshi Haraguchi, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 135 days.

(21) Appl. No.: 16/141,386

(22) Filed: Sep. 25, 2018

(65) Prior Publication Data

US 2019/0116772 A1  Apr. 25, 2019

(30) Foreign Application Priority Data

Oct. 25, 2017  (JP) .................. 2017-206293

(51) Int. Cl.
*A01K 89/01* (2006.01)
*A01K 89/015* (2006.01)
*F16D 23/12* (2006.01)

(52) U.S. Cl.
CPC ...... *A01K 89/0186* (2015.05); *A01K 89/0193* (2015.05); *F16D 23/12* (2013.01)

(58) Field of Classification Search
CPC .............. A01K 89/0186; A01K 89/01921
See application file for complete search history.

(56) References Cited

U.S. PATENT DOCUMENTS

| 4,638,958 | A | * | 1/1987 | Furomoto | ........ A01K 89/01928 242/310 |
|---|---|---|---|---|---|
| 5,318,244 | A | * | 6/1994 | Morimoto | .......... A01K 89/0186 242/261 |
| 5,598,983 | A | * | 2/1997 | Sato | ................... A01K 89/0192 242/261 |
| 10,253,826 | B2 | * | 4/2019 | Ahmad | .................... F16D 41/12 |
| 2012/0067993 | A1 | * | 3/2012 | Nakagawa | ....... A01K 89/01901 242/257 |
| 2015/0181853 | A1 | * | 7/2015 | Niitsuma | ............. A01K 89/015 242/257 |
| 2015/0296762 | A1 | * | 10/2015 | Haraguchi | ........... A01K 89/015 242/261 |
| 2015/0327527 | A1 | * | 11/2015 | Ikebukuro | .......... A01K 89/0192 242/264 |

FOREIGN PATENT DOCUMENTS

JP  2015-216867 A  12/2015

* cited by examiner

*Primary Examiner* — Emmanuel M Marcelo
(74) *Attorney, Agent, or Firm* — United IP Counselors, LLC

(57) ABSTRACT

A clutch operation unit of a dual-bearing reel is attached to a clutch lever extending in a left-right direction parallel to a rotational axis direction of a spool and for moving in an up-down direction with respect to the spool. The clutch operation unit has a first member that is to be operated by a user, and a second member that is combined with the first member to sandwich the clutch lever therebetween in the up-down direction.

11 Claims, 5 Drawing Sheets

CLUTCH OPERATION UNIT AND DUAL-BEARING REEL

CROSS-REFERENCE TO RELATED APPLICATION

This application claims priority to Japanese Patent Application No. 2017-206293, filed on Oct. 25, 2017, the entirety of which is hereby incorporated by reference in its entirety.

BACKGROUND

Technical Field

The present disclosure relates to a clutch operation unit and a dual-bearing reel.

Background Information

There has been known a dual-bearing reel in which a spool is rotated to wind a fishing line thereon by rotating a handle. The dual-bearing reel has a clutch lever for switching between transmission and non-transmission of the rotation of the handle to the spool. A clutch operation unit for operating the clutch lever is fixed to the clutch lever. Japanese Patent Application Laid-open No. 2015-216867, for example, discloses a clutch operation unit that is fixed to a clutch lever by tightening a screw at the spool side.

In the clutch operation unit of Japanese Patent Application Laid-open No. 2015-216867, the screw is attached at the spool side. Therefore, in removing the screw in order to remove the clutch operation unit from the clutch lever for the purpose of maintenance or the like, the spool becomes an obstacle, making the removal of the clutch operation unit complicated.

BRIEF SUMMARY

The present disclosure was contrived in view of such circumstances, and an object thereof is to provide a clutch operation unit and a dual-bearing reel that are configured to be able to achieve easy removal of the clutch operation unit from the clutch lever.

In order to achieve the foregoing object, a clutch operation unit according to a first aspect of the present disclosure is a clutch operation unit (e.g., a clutch operation unit 180) of a dual-bearing reel (e.g., a dual-bearing reel 100) that is attached to a clutch lever (e.g., a clutch lever 170) extending in a left-right direction parallel to a rotational axis direction of a spool (e.g., a spool 140) and moving in an up-down direction with respect to the spool, the clutch operation unit having:

a first member (e.g., a first member 181) that is to be operated by a user; and a second member (e.g., a second member 182) that is combined with the first member to sandwich the clutch lever therebetween in the up-down direction.

According to the clutch operation unit with the foregoing characteristics, the first member and the second member are configured to sandwich the clutch lever therebetween in the up-down direction. Thus, the spool does not become an obstacle in removing the clutch operation unit, resulting in achieving easy removal of the clutch operation unit from the clutch lever.

The clutch lever can be in the shape of a plate and have a first surface (e.g., a first surface 171) facing toward the spool and a second surface (e.g., a second surface 172) located opposite to the first surface, and the second member can extend in the left-right direction, can have a first recessed portion (e.g., recessed portions 182C and 182D) that is configured to allow the clutch lever to enter therein and has a bottom surface (e.g., bottom surfaces 182CA and 182DA) formed in a direction so as to come into contact with the second surface, and can be attached to the clutch lever from the second surface side.

According to this configuration, since the second member can be removed from the side opposite to the spool, the clutch operation unit can easily be removed from the clutch lever.

The first member can have, in a lower surface thereof, a slit (e.g., a slit 181B) that extends in the left-right direction and houses the clutch lever, and the second member can have a second recessed portion (e.g., a recessed portion S) recessed downward, into which the first member enters, and can be fixed to the first member by fastening a bottom portion (e.g., a bottom plate 182A) of the second recessed portion upward to the first member (e.g., fastening via a third member 183) by a fastening tool (e.g., a first fastening tool 184 and a second fastening tool 185).

According to this configuration, since the fastening tool can be removed downward, the spool does not obstruct the removal of the clutch operation unit, resulting in achieving easy removal of the clutch operation unit from the clutch lever.

The first member can have an engaging portion (e.g., a protruding portion 181BB) for coming into engagement with the clutch lever to restrict the first member from moving in the left-right direction with respect to the clutch lever.

According to this configuration, the clutch operation unit can firmly be fixed to the clutch lever.

The clutch operation unit can further have the fastening tool (e.g., the first fastening tool 184 and the second fastening tool 185) that fixes the second member to the first member by fastening the second member upward to the first member, and the second member can have a projection (e.g., a projection 182E) that projects downward at a rear end-side position of a fishing rod to which the dual-bearing reel is attached, the rear end-side position located behind a section where the second member is fastened to the first member by the fastening tool.

According to this configuration, since the second member has the projection that projects downward at the rear end of the fishing rod, the fastening tool cannot be seen from the rear-end side of the fishing rod due to the presence of the projection, improving the appearance of the clutch operation unit.

In order to achieve the foregoing object, a dual-bearing reel according to a second aspect of the present disclosure has the clutch operation unit.

According to the dual-bearing reel with the foregoing characteristics, the first member and the second member of the clutch operation unit are configured to sandwich the clutch lever therebetween in the up-down direction. Thus, the spool does not obstruct the removal of the clutch operation unit, resulting in achieving easy removal of the clutch operation unit from the clutch lever.

The present disclosure can provide a clutch operation unit and a dual-bearing reel that are configured to be able to achieve easy removal of the clutch operation unit from a clutch lever.

DETAILED DESCRIPTION OF EMBODIMENTS

Figure 1:
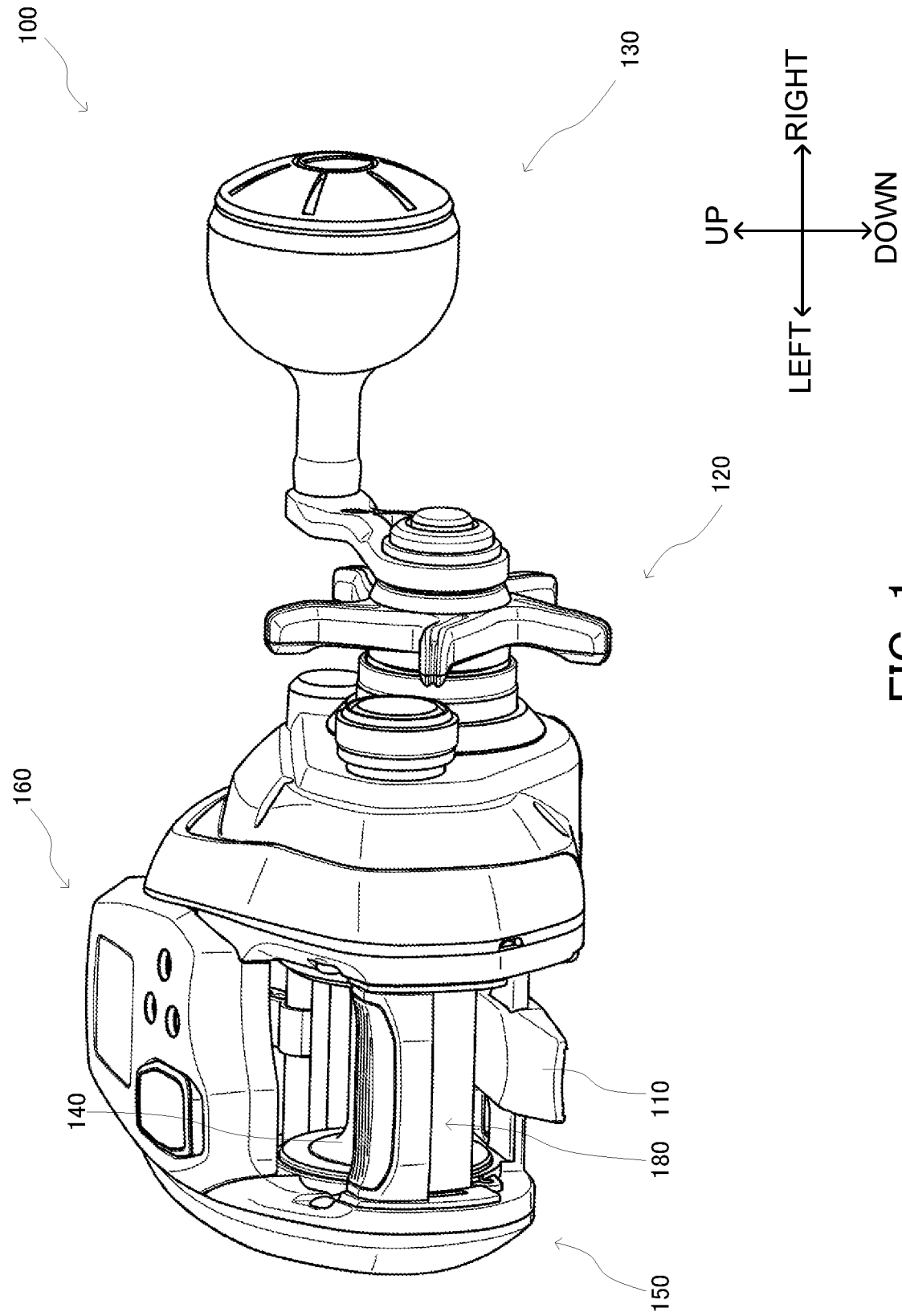
FIG. 1 is diagram showing the overall configuration of a dual-bearing reel according to an embodiment of the present disclosure.
Figure 2:
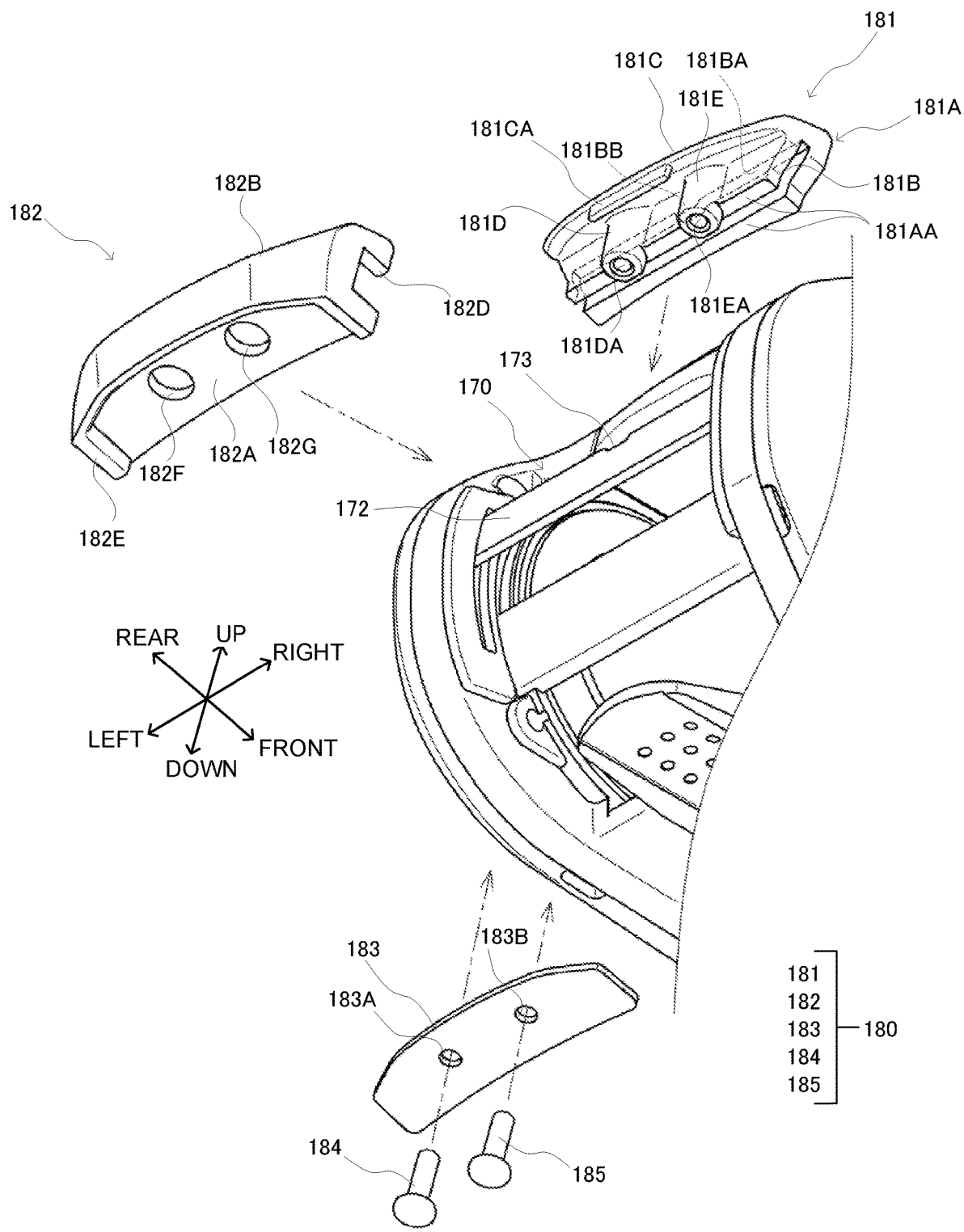
FIG. 2 is an exploded perspective view of the dual-bearing reel that is viewed from obliquely below according to the embodiment of the present disclosure.

A clutch operation unit and a dual-bearing reel according to an embodiment of the present disclosure are now described hereinafter with reference to the drawings. In the drawings, the same or like portions are given the same reference numerals.

(Configuration of Dual-Bearing Reel 100)

A configuration of a dual-bearing reel 100 according to the present embodiment is now described with reference to FIGS. 1 to 5. In the following descriptions, the direction in which a spool shaft functioning as a rotation shaft of a spool 140 described hereinafter extends is referred to as the left-right direction, the handle 130 side as "right," and the side opposite thereto as "left." Furthermore, with the dual-bearing reel 100 attached to a fishing rod, the fishing rod side is referred to as the "lower" side, the side opposite thereto as the "upper" side, the front end side of the fishing rod (the direction in which a fishing line is pulled out) as the "front" side, and the rear-end side of the fishing rod as the "rear" side.

As shown in FIG. 1 and the like, the dual-bearing reel 100 has a reel foot 110, a first main body 120, the handle 130, the spool 140, a second main body 150, a coupling portion 160, a clutch lever 170 (FIGS. 2, 3, etc.), and a clutch operation unit 180. The dual-bearing reel 100 is attached to a fishing rod by the reel foot 110. The dual-bearing reel 100 also has a level winding mechanism for evenly winding a fishing line on the spool 140, and the like. The first main body 120, the handle 130, the spool 140, the second main body 150, and the coupling portion 160 constitute a reel main body (the section except for the reel foot 110, the clutch lever 170, and the clutch operation unit 180) of the dual-bearing reel 100.

The first main body 120 rotatably supports one end of the spool 140. In addition, the handle 130 is attached to the first main body 120. The first main body 120 has a rotation transmission mechanism, a clutch mechanism, a mechanical brake, a drag mechanism, and the like.

The rotation transmission mechanism transmits rotation of the handle 130 to the spool 140 to rotate the spool 140. The clutch mechanism switches between transmission and non-transmission of the rotation of the handle 130 to the spool 140 (interlocking/non-interlocking between the handle 130 and the spool 140) performed by the rotation transmission mechanism. Well-known mechanisms can be employed as these mechanisms.

The rotation transmission mechanism has, for example, a drive gear that rotates together with the handle 130, and a pinion gear that directly meshes with the drive gear or interlocks with the drive gear via one or more gears. The pinion gear is provided so as to be movable in the left-right direction. The pinion gear has a recessed portion into which a pin can enter, the pin being provided on the spool shaft, that is, the rotation shaft of the spool 140.

When the pinion gear is located on the left-hand side, the pin enters the recessed portion, causing the pinion gear and the spool 140 to come into engagement with each other. In this state, the rotation of the handle 130 is transmitted to the spool 140 via the drive gear and the pinion gear, thereby rotating the spool 140. When the pinion gear is located on the right-hand side, the pin does not enter the recessed portion, so that the pinion gear and the spool 140 do not come into engagement with each other. In this state, the rotation of the handle 130 is not transmitted to the spool 140, and consequently the spool 140 does not rotate.

The clutch mechanism switches between transmission and non-transmission of the rotation of the handle 130 by, for example, moving the pinion gear side to side. The clutch mechanism has a clutch plate C1 (FIG. 3), a clutch cam, and a clutch yoke. The clutch plate C1 is coupled to the clutch lever 170 by a coupling portion C2. The clutch plate C1 rotates in response to movement of the clutch lever 170 in the up-down direction. The clutch cam is rotated by the rotation of the clutch plate C1. The clutch cam rotates to move the clutch yoke in the left-right direction. The clutch yoke moves in the left-right direction together with the pinion gear.

The clutch mechanism is operated by the clutch lever 170. The clutch lever 170 moves in an arc-shaped trajectory in the up-down direction. The clutch operation unit 180 is mounted on the clutch lever 170, and the clutch lever 170 is operated through the clutch operation unit 180.

When the clutch lever 170 is located at an upper position thereof, the pinion gear is located on the left-hand side, and the pinion gear and the spool 140 are engaged with each other. In other words, when the clutch lever 170 is located at an upper position, the clutch mechanism is in a state of transmitting the rotation of the handle 130 to the spool 140 (hereinafter, this state is also referred to as a state in which the clutch mechanism is ON).

When the clutch lever 170 is pressed downward in the state in which the clutch mechanism is ON, the clutch plate C1 and the clutch cam rotate as a result of this pressing-down operation, moving the clutch yoke to the right. As a result, the pinion gear moves to the right, disengaging the pinion gear and the spool 140 from each other. In this manner, when the clutch lever 170 moves to a lower position thereof, the clutch mechanism enters a state of not transmitting the rotation of the handle 130 to the spool 140 (hereinafter, this state is also referred to as a state in which the clutch mechanism is OFF).

The clutch plate C1 and the like are biased by a spring or the like, and when the pressing-down operation on the clutch lever 170 is canceled, the clutch lever 170 returns to the upper position thereof (the clutch mechanism returns to the ON state thereof). Note that the clutch mechanism can be configured in such a manner that even when the pressing-down operation of the clutch lever 170 is canceled, the clutch lever 170 remains in the lower position thereof (the clutch mechanism remains OFF), and that when the clutch lever 170 is pressed downward the clutch lever 170 is returned to the upper position thereof.

The second main body 150 rotatably supports the other end of the spool 140. The second main body 150 also has a plurality of gears and the like (not shown) for rotating a worm shaft of the level winding mechanism in response to the rotation of the spool 140. Note that the plurality of gears can be disposed inside the first main body 120. The second main body 150 also can have a battery case for housing a battery for operating a water depth counter described hereinafter, a rotation sensor for detecting the rotation of the spool, and the like.

The coupling portion 160 couples the first main body 120 and the second main body 150 that are separated from each other with the spool 140 placed therebetween. The dual-bearing reel 100 also can function as the water depth counter for displaying a gimmick water depth, and the coupling portion 160 can have a display device for displaying the water depth, an operation button for operating the water depth counter, and the like.

(Clutch Lever 170)

The clutch lever 170 is formed integrally with the clutch plate C1 and the coupling portion C2. The clutch lever 170 is in the shape of a rectangular flat plate and has a first surface 171 facing toward the spool 140 and a second surface 172 opposite to the first surface 171. The clutch lever 170 also has, on an upper surface thereof, a recessed portion 173 recessed downward. As described above, the clutch lever 170 is a member for switching between transmission and non-transmission of the rotation of the handle 130 to the spool 140.

(Clutch Operation Unit 180)

As shown in FIGS. 2 to 5, the clutch operation unit 180 is mounted on the clutch lever 170 so as to surround the clutch lever 170 and is pressed downward by a user in order to move the clutch lever 170. The clutch operation unit 180 has a first member 181, a second member 182, a third member 183, a first fastening tool 184, and a second fastening tool 185. The second member 182 and the third member 183 are fixed to the first member 181 by fastening the second member 182 to the first member 181 via the third member 183 by using the first fastening tool 184 and the second fastening tool 185, thereby configuring the clutch operation unit 180. The first fastening tool 184 and the second fastening tool 185 are, for example, bolts.

The first member 181 is a member that is attached to the clutch lever 170 from above and with which a finger of the user, such as a thumb, comes into contact. In other words, the first member 181 is a member operated by the user. An upper surface of the first member 181 is formed to be gently curved downward to conform to the shape of the thumb. In addition, non-slip thin grooves can be formed on this upper surface in the left-right direction. The first member 181 has a main body 181A, a slit 181B, a bulging portion 181C, a first boss 181D, and a second boss 181E.

The main body 181A is roughly in a rectangular parallelepiped shape in which the lateral width thereof gradually narrows from the upper side toward the lower side. A lower surface 181AA of the main body 181A is formed into a planar shape so as to come into surface-contact with a bottom plate 182A of the second member 182, which is described hereinafter. The slit 181B extending in the left-right direction is formed on this lower surface 181AA.

The slit 181B reaches the left and right side surfaces of the main body 181A and houses the clutch lever 170. The lower surface 181AA of the main body 181A is divided into two regions by the slit 181B. A protruding portion 181BB is formed on a bottom surface 181BA of the slit 181B. The protruding portion 181BB protrudes downward from the bottom surface 181BA of the slit 181B, to come into engagement with the recessed portion 173 of the clutch lever 170. The protruding portion 181BB is formed to be fitted with, for example, the recessed portion 173. The engagement between the recessed portion 173 and the protruding portion 181BB restricts the first member 181 from moving in the left-right direction.

The bulging portion 181C bulges from an upper portion of the main body 181A, in a direction away from the spool 140. The bulging portion 181C, as a whole, curves in such a manner as to be inclined downward in the direction away from the spool 140. The shape of the bulging portion 181C conforms to the shape of the second member 182. The bulging portion 181C has a plate-like projection 181CA that projects downward.

The first boss 181D and the second boss 181E each have a cylindrical shape. The first boss 181D and the second boss 181E each are configured in such a manner as to partially bite into the main body 181A. The first boss 181D and the second boss 181E are spaced apart from each other in the left-right direction. A lower end portion of the first boss 181D and a lower end portion of the second boss 181E are each configured to project downward from the lower surface 181AA of the main body 181A. The first boss 181D has a screw hole (female screw portion) 181DA into which the first fastening tool 184 is threaded, and the second boss 181E has a screw hole (female screw portion) 181EA into which the second fastening tool 185 is threaded.

The second member 182 is a member attached to roughly the lower side of the clutch lever 170. By being combined with the first member 181, the second member 182 cooperates with the first member 181 to sandwich the clutch lever 170 therebetween in the up-down direction. The second member 182 includes the bottom plate 182A, a side wall 182B standing upward from a rim portion of the bottom plate 182A, recessed portions 182C and 182D provided at both left and right end portions of the side wall 182B, a projection 182E projecting downward from the rim portion of the bottom plate 182A, and a first through hole 182F and a second through hole 182G that are provided on the bottom plate 182A.

The bottom plate 182A is a plate-like portion. The lower surface 181AA of the main body 181A of the first member 181 comes into abutment with the bottom plate 182A, and the bottom plate 182A closes the slit 181B from below. The bottom plate 182A and the first member 181 sandwich the clutch lever 170 therebetween in the up-down direction, the clutch lever 170 being housed in the slit 181B.

Figure 4:
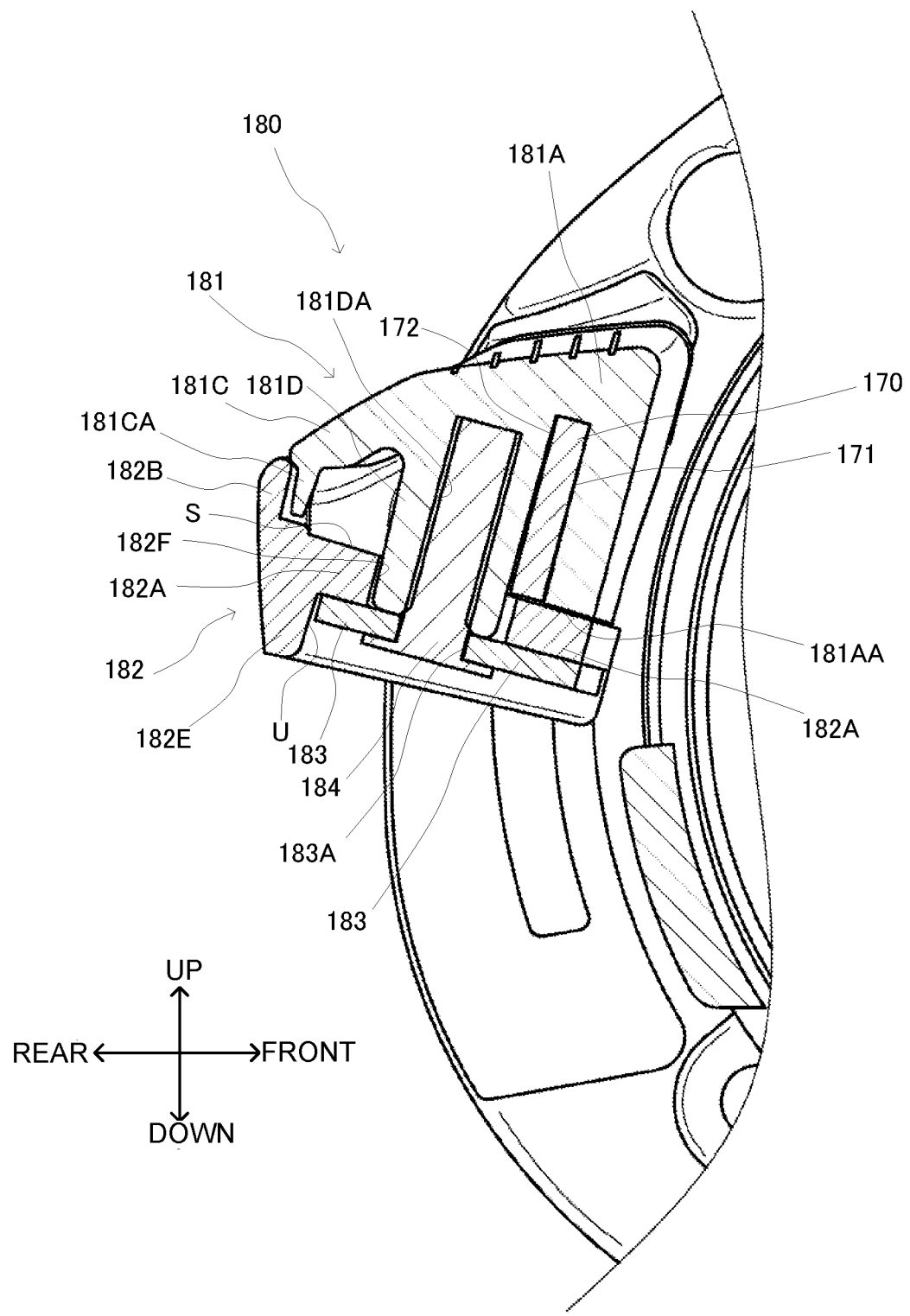
FIG. 4 is a cross-sectional view of a clutch operation unit cut along to include a first fastening tool according to the embodiment of the present disclosure.
Figure 5:
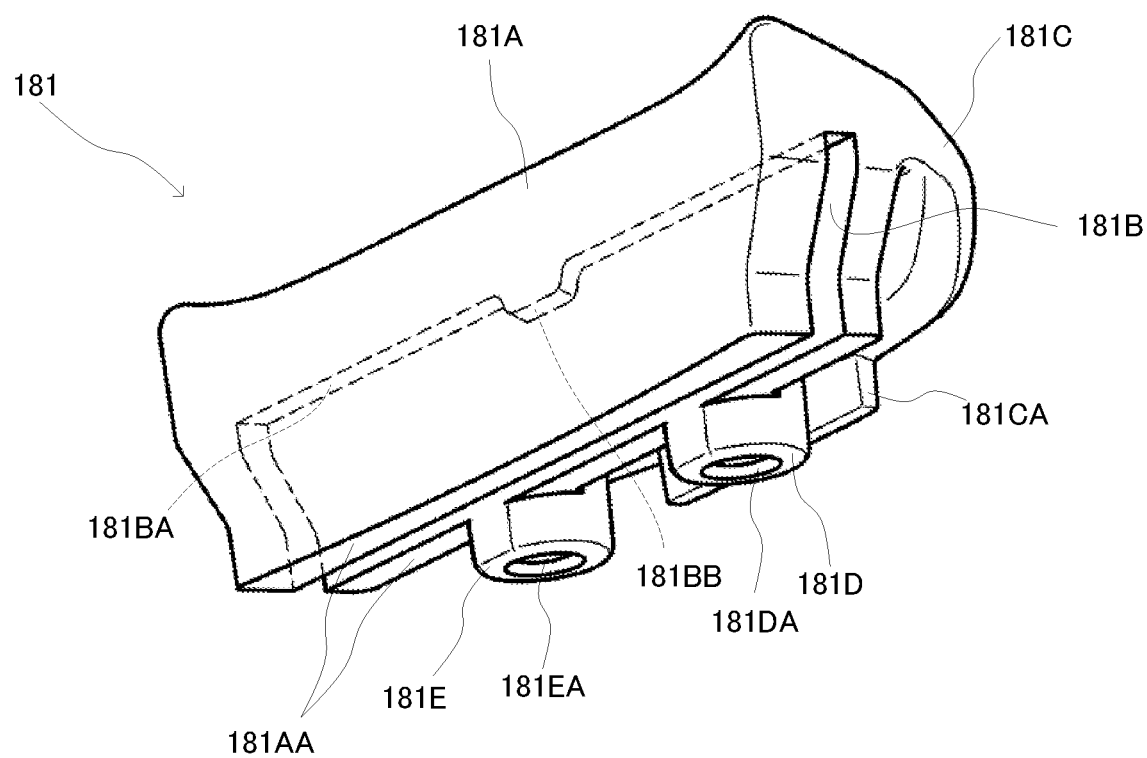
FIG. 5 is a perspective view of a first member of the clutch operation unit according to the embodiment of the present disclosure.

The side wall 182B is disposed in the portion of the bottom plate 182A other than the spool 140 side of the bottom plate 182A, wherein a central portion of an upper end portion of the side wall 182B is recessed so as to conform to the shape of the first member 181. The side wall 182B is configured so as not to create a gap when the first member 181 and the second member 182 are combined. In addition, the side wall 182B and the bottom plate 182A form a recessed portion S that is located at the center of the second member 182 in the left-right direction and recessed downward. A lower portion of the first member 181 enters this recessed portion S. Note that the projection 181CA of the bulging portion 181C of the first member 181 enters inside the side wall 182B. As a result, the position of the first member 181 is determined. The recessed portion S is covered by the bulging portion 181C and is hollow inside (FIG. 4). For this reason, the clutch operation unit 180 is made lightweight.

The recessed portions 182C and 182D are formed at both the left and right end portions of the side wall 182B. A side wall surface on the lower side of each of the recessed portions 182C and 182D is flush with an upper surface of the bottom plate 182A. Therefore, these respective side wall surfaces on the lower side and the upper surface of the bottom plate 182A are, as a whole, in abutment with a lower surface of the clutch lever 170. The clutch lever 170 is inserted into the recessed portions 182C and 182D from the front side (the spool 140 side). In other words, the recessed portions 182C and 182D are formed to face toward the spool 140. Specifically, the recessed portions 182C and 182D are configured in such a manner that the bottom surfaces 182CA and 182DA thereof come into contact with the second surface 172 of the clutch lever 170, and are each formed into a substantially U-shape when viewed from the left-right direction.

As shown in FIG. 4 and the other figures, the projection 182E projects downward in such a manner that a lower end portion thereof stretches farther below lower ends of the first fastening tool 184 and the second fastening tool 185. In particular, the projection 182E projects downward in such a manner that the user holding the fishing rod cannot visually recognize the first fastening tool 184 and the second fastening tool 185. The projection 182E is disposed in a substantially U-shape when viewed from below, in such a manner as to surround the first fastening tool 184 and the second fastening tool 185 from the rear side (the side opposite to the spool 140) and from both right and left sides.

Due to the foregoing configuration of the projection 182E, in the clutch operation unit 180, head portions of the first fastening tool 184 and the second fastening tool 185 are disposed in a space U surrounded by the projection 182E (FIG. 4), whereby the first fastening tool 184 and the second fastening tool 185 can be hidden from the user holding the fishing rod. In particular, since the projection 182E has the portion that protrudes downward at the position behind the fastened section of the first fastening tool 184 and the second fastening tool 185 (the rear-end side of the fishing rod, with the dual-bearing reel 100 attached thereto), this portion can hide the first fastening tool 184 and the second fastening tool 185 from the user who uses the fishing rod and the dual-bearing reel 100.

The first boss 181D and the second boss 181E of the first member 181 enter the first through hole 182F and the second through hole 182G, respectively. As a result, the first member 181 and the second member 182 are aligned with each other.

The third member 183 is a plate-like member and comes into abutment with the bottom plate 182A of the second member 182. The third member 183 has through holes 183A and 183B through which the first fastening tool 184 and the second fastening tool 185 pass respectively. The first fastening tool 184 and the second fastening tool 185 are threaded into the first boss 181D and the second boss 181E through the through holes 183A and 183B respectively. As a result, the third member 183 is pressed against the second member 182, fastening the second member 182 (particularly, the bottom plate 182A) to the first member 181. As a result, the clutch lever 170 is sandwiched by the first member 181 and the second member 182 in the up-down direction. By fastening the second member 182 (particularly, the bottom plate 182A) to the first member 181, the second member 182 is fixed to the first member 181 together with the third member 183, whereby the clutch operation unit 180 is assembled. By being fastened with the first fastening tool 184 and the second fastening tool 185, the third member 183 prevents the second member 182 from being damaged. Moreover, the fastening force of the first fastening tool 184 and the second fastening tool 185 is made uniform by the entire third member 183.

(Attachment and Detachment of Clutch Operation Unit 180)

Figure 3:
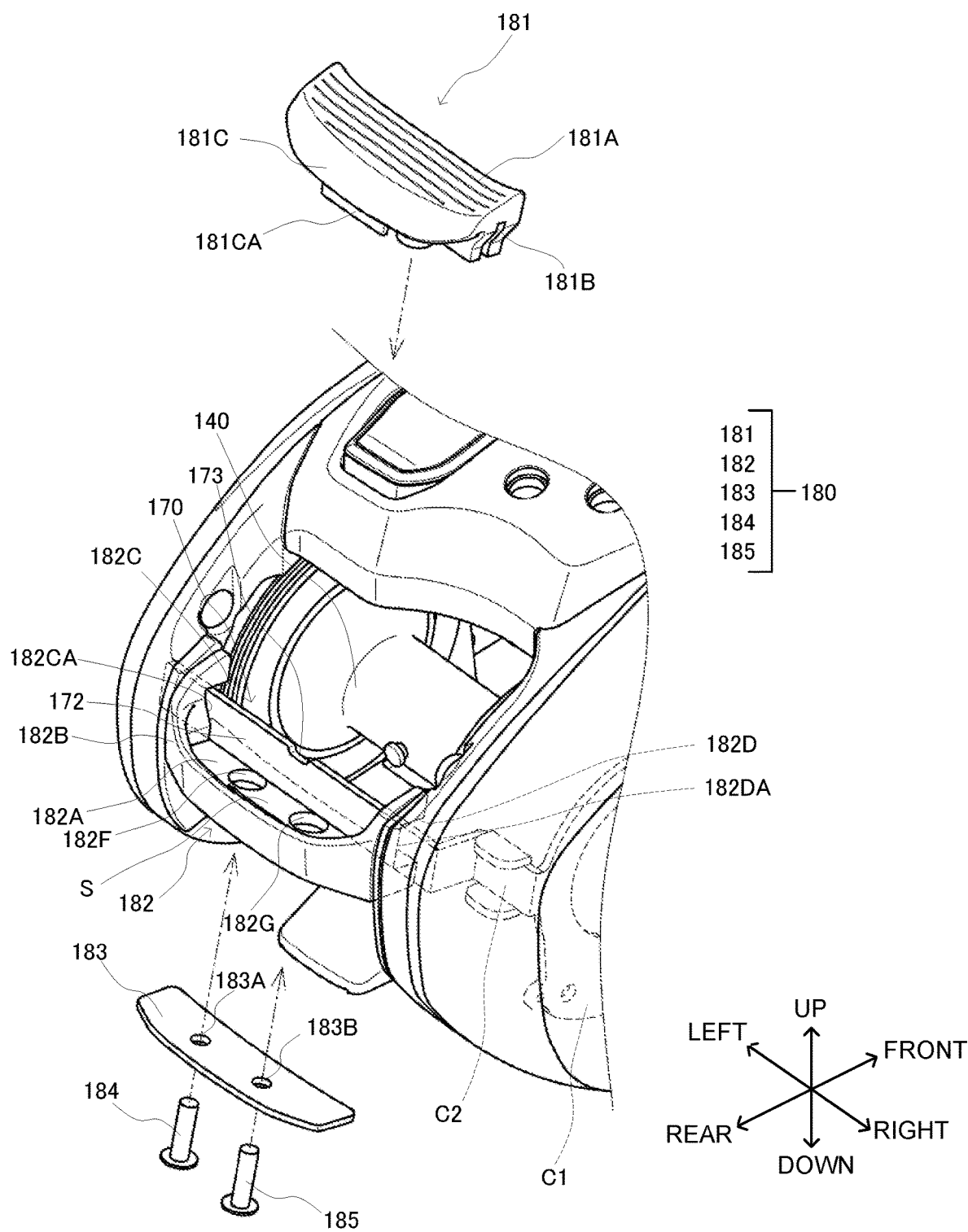
FIG. 3 is an exploded perspective view of the dual-bearing reel that is viewed from obliquely above according to the embodiment of the present disclosure.

A method for attaching the clutch operation unit 180 to the clutch lever 170 is now described. First, from the state shown in FIG. 2, the second member 182 is mounted onto the clutch lever 170 from the rear side of the clutch lever 170 (the second surface 172 side), as shown in FIG. 3. In this mounting, the second member 182 is mounted on the clutch lever 170 in such a manner that the bottom surfaces 182CA and 182DA of the recessed portions 182C and 182D respectively come into contact with the second surface 172 of the clutch lever 170.

Next, the first member 181 is placed on the clutch lever 170 from above, thereby mounting the first member 181 on the clutch lever 170 from above. In this mounting, the clutch lever 170 is housed in the slit 181B of the first member 181, and the first member 181 is combined with the second member 182. Subsequently, the third member 183 is pressed against a lower surface of the second member 182 from below, and the first fastening tool 184 and the second fastening tool 185 are threaded into the first boss 181D and the second boss 181E via the through holes 183A and 183B, thereby causing the first member 181 (particularly, the bottom surface 181BA of the slit 181B) and the second member 182 (particularly, the bottom plate 182A) to sandwich the clutch lever 170 therebetween in the up-down direction. As a result, the first member 181, the second member 182 and the like are fixed to the clutch lever 170. At this moment, since the clutch lever 170 is housed in the slit 181B of the first member 181 and the bottom surfaces 182CA and 182DA of the recessed portions 182C and 182D of the second member 182 are in contact with the second surface 172 of the clutch lever 170, the first member 181 and the second member 182 are prevented from being shifted in a front-rear direction with respect to the clutch lever 170. In this manner, the attachment of the clutch operation unit 180 to the clutch lever 170 is completed.

On the other hand, when detaching the clutch operation unit 180 from the clutch lever 170, firstly, the first fastening tool 184 and the second fastening tool 185 are loosened and removed from the first to third members 181 to 183. Subsequently, the first to third members 181 to 183 are removed from the clutch lever 170.

Effects of Embodiment

According to this embodiment, the first member 181 and the second member 182 sandwich the clutch lever 170 therebetween in the up-down direction, so that when detaching the clutch operation unit 180 from the clutch lever 170, the spool 140 does not obstruct the detachment (e.g., as shown in FIG. 4, since the bolts need only be removed from below, the presence of the spool 140 does not become an obstacle), enabling easy detachment of the clutch operation unit 180 from the clutch lever 170. Thus, the second member 182 is an example of a means for enabling detachment of the clutch operation unit 180 from the clutch lever 170.

The bottom surfaces of the second member 182 (e.g., the bottom surfaces 182CA and 182DA) have the recessed portions 182C and 182D that are formed in such a manner as to come into contact with the second surface 172 of the clutch lever 170, and accordingly the second member 182 is attached to the clutch lever 170 from the rear side (the second surface 172 side). Thus, the second member 182 can be removed from the side opposite to the spool 140, enabling easy detachment of the clutch operation unit 180 from the clutch lever 170.

The first member 181 has the slit 181B, and the second member 182 has the recessed portion S. The bottom plate 182A is fixed to the first member 181 by being fastened upward to the first member 181 via the third member 183 by the first fastening tool 184 and the second fastening tool 185. Therefore, when detaching the clutch operation unit 180 from the clutch lever 170, the first fastening tool 184 and the second fastening tool 185 can be removed downward, wherein the spool 140 does not obstruct the removal (e.g., as shown in FIG. 4, since the bolts need only be removed from below, the spool 140 does not become an obstacle), enabling easy detachment of the clutch operation unit 180 from the clutch lever 170.

Since the first member 181 has the protruding portion 181BB that comes into engagement with the recessed portion 173 of the clutch lever 170, the clutch operation unit 180 can be restricted from moving in the left-right direction with respect to the clutch lever 170. Accordingly, the clutch operation unit 180 can firmly be fixed to the clutch lever 170.

The second member 182 can hide the first fastening tool 184 and the second fastening tool 185 by means of the projection 182E that at least has the portion that protrudes downward at the position on the rear-end side of the fishing rod to which the dual-bearing reel 100 is attached, the position being located behind the section fastened by the first fastening tool 184 and the second fastening tool 185. According to this embodiment, therefore, the clutch operation unit 180 has an improved appearance. Note that the height of the projection 182E can be short. As long as the first fastening tool 184 and the second fastening tool 185 can partially be hidden, the appearance of the clutch operation unit 180 can be improved to some extent.

(Modifications)

The present disclosure is not limited to the foregoing embodiment, and the following modifications of the foregoing embodiment are possible.

In the foregoing embodiment, the first member 181 is attached to the clutch lever 170 from above the clutch lever 170, and the second member 182 is attached to the clutch lever 170 from the second surface 172 side of the clutch lever 170. However, the present disclosure is not limited to this configuration. For example, both the first member 181 and the second member 182 can be configured as block-like members, and slits extending in the left-right direction can be formed in the lower surface of the first member 181 and the upper surface of the second member 182 respectively, and then the first member 181 and the second member 182 can sandwich the clutch lever 170 therebetween from above and below.

In the foregoing embodiment, the first member 181 has the slit 181B, and the second member 182 has the recessed portions 182C and 182D. However, the present disclosure is not limited to this configuration. For example, the first member 181 can be provided with a recessed portion for accommodating the clutch lever 170, and the second member 182 can be provided with a slit for accommodating the clutch lever 170.

In the foregoing embodiment, the third member 183 is disposed between the bottom plate 182A of the second member 182 and the head portions of the first fastening tool 184 and the second fastening tool 185. However, the present disclosure is not limited to this configuration. For example, a washer can be disposed between the bottom plate 182A of the second member 182 and the head portions of the first fastening tool 184 and the second fastening tool 185. Furthermore, in a case where the head portions of the first fastening tool 184 and the second fastening tool 185 each have a hole diameter larger than those of the through holes 182G and 182F of the second member 182, the bottom plate 182A of the second member 182 can be brought into direct contact with the head portions of the first fastening tool 184 and the second fastening tool 185.

In the foregoing embodiment, bolts (bolts with heads) are used as the first fastening tool 184 and the second fastening tool 185. However, the present disclosure is not limited to this configuration. For example, a hook can be provided on the first member 181, and a locking hole capable of detachably locking the hook thereto can be provided on the second member 182, so that when the first member 181 and the second member 182 are combined, the hook is detachably locked to the locking hole.

In the foregoing embodiment, the screw holes 181DA and 181EA are formed in the first boss 181D and the second boss 181E of the first member 181, and the through holes 182F and 182G corresponding to the screw holes 181DA and 181EA are formed in the second member 182. However, the present disclosure is not limited to this configuration. Three or more of the screw holes and the through holes can be formed and disposed alternately in the first member 181 and the second member 182.

In the foregoing embodiment, the recessed portion 173 of the clutch lever 170 and the protruding portion 181BB of the first member 181 are engaged with each other. However, the present disclosure is not limited to this configuration. For example, the protruding portion can be provided on the clutch lever 170 and the recessed portion can be provided on the first member 181, and then the protruding portion and the recessed portion can be brought into engagement with each other. In addition, a vertical groove extending in the up-down direction can be provided on either one of the clutch lever 170 and the first member 181, and a protruding portion capable of sliding in the vertical groove can be provided on the other. The number of engaging portions for bringing the clutch lever 170 and the first member 181 into engagement with each other is not limited to one; two or more engaging portions can be arranged side-by-side in the left-right direction.

In the foregoing embodiment, the first fastening tool 184 and the second fastening tool 185 are hidden by the projection 182E. However, the present disclosure is not limited to this configuration. A cover for covering the bottom plate 182A of the second member 182 can be attached so that the first fastening tool 184 and the second fastening tool 185 are invisible from the outside.

In the foregoing embodiment, the first fastening tool 184 and the second fastening tool 185 are fastened from the second member 182 toward the first member 181. However, the present disclosure is not limited to this configuration. For example, a through hole can be formed in the first member 181 and a screw hole can be formed in the corresponding position in the second member 182 in such a manner that the first fastening tool 184 and the second fastening tool 185 are fastened from the first member 181 toward the second member 182.

The foregoing embodiment is merely illustrative, and the present disclosure is not limited thereto; various embodiments are possible within the gist of the advancements described in the patent claims. The constituent elements described in the embodiment and modifications can be freely combined. Moreover, advancements equivalent to the advancements described in the patent claims are also included in the present disclosure.

EXPLANATION OF REFERENCE NUMERALS

100 Dual-bearing reel
110 Reel foot

120 First main body
130 Handle
140 Spool
150 Second main body
160 Coupling portion
170 Clutch lever
171 First surface
172 Second surface
173 Recessed portion
180 Clutch operation unit
181 First member
181A Main body
181AA Lower surface
181B Slit
181BA Bottom surface
181BB Protruding portion
181C Bulging portion
181CA Projection
181D First boss
181DA Screw hole
181E Second boss
181EA Screw hole
182 Second member
182A Bottom plate
182B Side wall
182C Recessed portion
182CA Bottom surface
182D Recessed portion
182DA Bottom surface
182E Projection
182F First through hole
182G Second through hole
183 Third member
183A Through hole
183B Through hole
184 First fastening tool
185 Second fastening tool
C1 Clutch plate
C2 Coupling portion
S Recessed portion
U Space

What is claimed is:

1. A clutch operation unit of a dual-bearing reel and that is attached to a clutch lever extending in a left-right direction parallel to a rotational axis direction of a spool and for moving in an up-down direction with respect to the spool, the clutch operation unit comprising:
a first member that is to be operated by a user; and
a second member that is combined with the first member to sandwich the clutch lever therebetween in the up-down direction.

2. The clutch operation unit according to claim 1, wherein the clutch lever is in the shape of a plate and has a first surface facing toward the spool and a second surface located opposite to the first surface, and
the second member extends in the left-right direction, has a first recessed portion that is configured to allow the clutch lever to enter therein and that has a bottom surface formed in a direction so as to come into contact with the second surface, and is attached to the clutch lever from the second surface side.

3. The clutch operation unit according to claim 2, wherein the first member has, in a lower surface thereof, a slit that extends in the left-right direction and houses the clutch lever, and
the second member has a second recessed portion recessed downward, into which the first member enters, and is fixed to the first member by fastening a bottom portion of the second recessed portion upward to the first member by a fastening tool.

4. The clutch operation unit according to claim 3, further comprising:
the fastening tool that fixes the second member to the first member by fastening the second member upward to the first member, wherein
the second member has a projection that projects downward at a rear end-side position of a fishing rod to which the dual-bearing reel is to be attached, the rear end-side position located behind a section where the second member is fastened to the first member by the fastening tool.

5. The clutch operation unit according to claim 1, wherein the first member has an engaging portion for coming into engagement with the clutch lever to restrict the first member from moving in the left-right direction with respect to the clutch lever.

6. A dual-bearing reel, comprising the clutch operation unit according to claim 1.

7. A dual-bearing reel, comprising:
a clutch operation unit attached to a clutch lever extending in a left-right direction parallel to a rotational axis direction of a spool and for moving in an up-down direction with respect to the spool, the clutch operation unit including
a first member having an upper surface curved downward; and
a second member that is combined with the first member to sandwich the clutch lever therebetween in the up-down direction.

8. The dual-bearing reel according to claim 7, wherein the clutch lever is in the shape of a plate and has a first surface facing toward the spool and a second surface located opposite to the first surface, and
the second member extends in the left-right direction, has a first recessed portion to allow the clutch lever to enter therein and that has a bottom surface to come into contact with the second surface, and is attached to the clutch lever from the second surface side.

9. The dual-bearing reel according to claim 8, wherein the first member has, in a lower surface thereof, a slit that extends in the left-right direction and houses the clutch lever, and
the second member has a second recessed portion recessed downward, into which the first member enters, and is fixed to the first member by fastening a bottom portion of the second recessed portion upward to the first member by a fastening tool.

10. The dual-bearing reel according to claim 9, further comprising:
the fastening tool, wherein
the second member has a projection that projects downward at a rear end-side position of a fishing rod to which the dual-bearing reel is to be attached, the rear end-side position located behind a section where the second member is fastened to the first member by the fastening tool.

11. The dual-bearing reel according to claim 7, wherein the first member has an engaging portion for coming into engagement with the clutch lever to restrict the first member from moving in the left-right direction with respect to the clutch lever.

* * * * *